(12) United States Patent
Zhang et al.

(10) Patent No.: US 11,593,141 B2
(45) Date of Patent: Feb. 28, 2023

(54) ATOMIC GROUPS FOR CONFIGURING HCI SYSTEMS

(71) Applicant: Dell Products L.P., Round Rock, TX (US)

(72) Inventors: Tianming Zhang, Hopkinton, MA (US); Jason Jianxin Ye, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 16/915,788

(22) Filed: Jun. 29, 2020

(65) Prior Publication Data
US 2021/0406058 A1    Dec. 30, 2021

(51) Int. Cl.
G06F 9/52      (2006.01)
G06F 9/455    (2018.01)
G06F 9/445    (2018.01)

(52) U.S. Cl.
CPC ...... *G06F 9/45558* (2013.01); *G06F 9/44505* (2013.01); *G06F 9/52* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,835,698 A * | 11/1998 | Harris | ................. | G06F 11/0793 |
| | | | | 714/10 |
| 7,310,711 B2 * | 12/2007 | New | ..................... | G06F 3/0614 |
| | | | | 714/E11.131 |
| 8,078,588 B2 * | 12/2011 | Lakshminath | ...... | G06F 16/2365 |
| | | | | 707/684 |
| 8,935,570 B2 * | 1/2015 | Childers, Jr. | ....... | G06F 11/1474 |
| | | | | 714/19 |
| 9,110,712 B2 * | 8/2015 | Kalavacharla | .......... | G06F 16/90 |
| 9,165,025 B2 * | 10/2015 | Maple | ................. | G06F 11/1471 |
| 9,274,937 B2 * | 3/2016 | Batwara | | G06F 9/5016 |
| 9,910,777 B2 * | 3/2018 | Flynn | .................. | G06F 11/1471 |
| 9,928,072 B1 * | 3/2018 | Tene | ..................... | G06F 9/3842 |
| 10,140,108 B1 | 11/2018 | Ford | | |
| 2013/0166855 A1 * | 6/2013 | Batwara | ................ | G06F 3/0659 |
| | | | | 711/154 |

\* cited by examiner

*Primary Examiner* — Van H Nguyen
(74) *Attorney, Agent, or Firm* — Jackson Walker L.L.P.

(57) ABSTRACT

An information handling system may include at least one processor, and a non-transitory memory coupled to the at least one processor. The information handling system may be configured to execute a configuration procedure to set up a plurality of information handling resources of the information handling system, and wherein the configuration procedure includes a plurality of logical groups related to different types of configuration. Each logical group may include one or more atomic groups, each atomic group including a plurality of logically related atomic operations. In response to a failure of a particular atomic operation of a particular atomic group, the information handling system may be configured to roll back the particular atomic operation and allow the configuration procedure to be restarted at a beginning of the particular atomic group.

20 Claims, 2 Drawing Sheets

ATOMIC GROUPS FOR CONFIGURING HCI SYSTEMS

TECHNICAL FIELD

The present disclosure relates in general to information handling systems, and more particularly to the configuration of information handling systems such as server information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system).

The initial installation of an HCI cluster typically includes initialization of all compute hosts in the cluster, networks, storage, etc. Additional steps may also be needed to set up management virtual machines (VMs). The installation workflow may consist of over 100 different steps, and it can fail if any of the steps fails. For example, any hardware incompatibility with compute, network, and/or storage software could cause the installation to fail.

Other failures may include network configuration (e.g., switch, router, DNS, etc.) issues, as well as environmental issues (e.g., cabling). When an installation fails, users or customer support engineers may have to find and fix the issues, then attempt to resume the software installation. Often, the root cause of the failure may have occurred many steps before the actual observed failure. Additionally, users may decide to replace the hardware related to the failure and/or manually perform some configuration steps. As a result, simply resuming the installation from the exact step of the last failure does not always work.

Accordingly, when the resume operation fails, the user may need to have all of the nodes in the cluster re-imaged and start the cluster installation all over again. In some instances, this same re-imaging and installation cycle may have to be repeated multiple times before all errors are found and fixed.

Accordingly, embodiments of this disclosure provide techniques for performing such installation in a more robust manner. Although the specific example of HCI infrastructure is discussed in detail for the sake of clarity and exposition, one of ordinary skill in the art with the benefit of this disclosure will appreciate that its techniques may also be applied in other contexts.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the configuration of server information handling systems may be reduced or eliminated.

In accordance with embodiments of the present disclosure, an information handling system may include at least one processor, and a non-transitory memory coupled to the at least one processor. The information handling system may be configured to execute a configuration procedure to set up a plurality of information handling resources of the information handling system, and wherein the configuration procedure includes a plurality of logical groups related to different types of configuration. Each logical group may include one or more atomic groups, each atomic group including a plurality of logically related atomic operations. In response to a failure of a particular atomic operation of a particular atomic group, the information handling system may be configured to roll back the particular atomic operation and allow the configuration procedure to be restarted at a beginning of the particular atomic group.

In accordance with these and other embodiments of the present disclosure, a method may include executing, at an information handling system, a configuration procedure to set up a plurality of information handling resources of the information handling system, wherein the configuration procedure includes a plurality of logical groups related to different types of configuration; for each logical group, the information handling system executing one or more atomic groups, each atomic group including a plurality of logically related atomic operations; and in response to a failure of a particular atomic operation of a particular atomic group, the information handling system rolling back the particular atomic operation and allowing the configuration procedure to be restarted at a beginning of the particular atomic group.

In accordance with these and other embodiments of the present disclosure, an article of manufacture may include a non-transitory, computer-readable medium having computer-executable code thereon that is executable by an information handling system for: executing a configuration procedure to set up a plurality of information handling resources of the information handling system, wherein the configuration procedure includes a plurality of logical groups related to different types of configuration; for each logical group, executing one or more atomic groups, each atomic group including a plurality of logically related atomic operations; and in response to a failure of a particular atomic operation of a particular atomic group, rolling back the particular atomic operation and allowing the configuration procedure to be restarted at a beginning of the particular atomic group.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
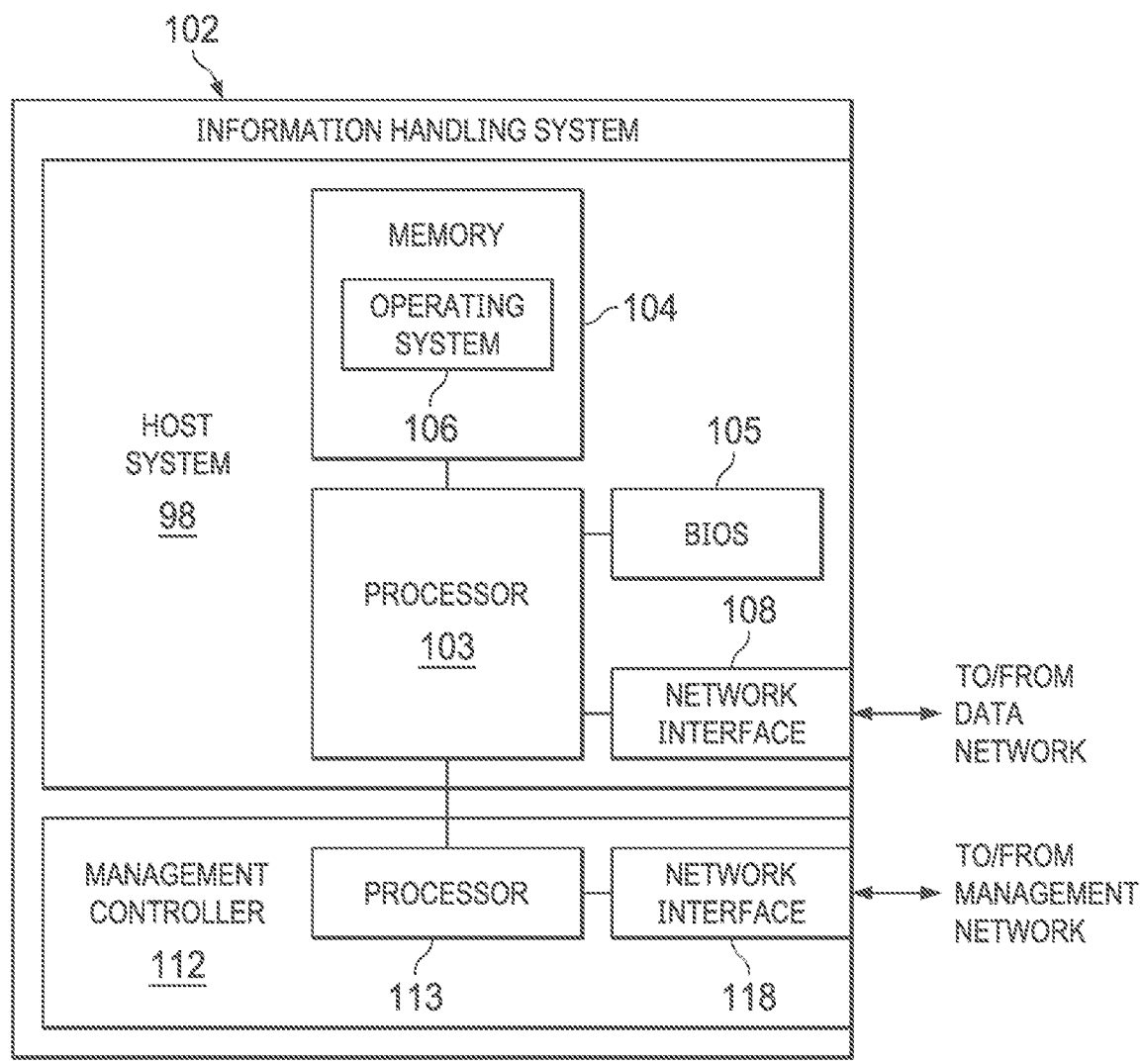
FIG. 1 illustrates a block diagram of an example information handling system, in accordance with embodiments of the present disclosure.
Figure 2:
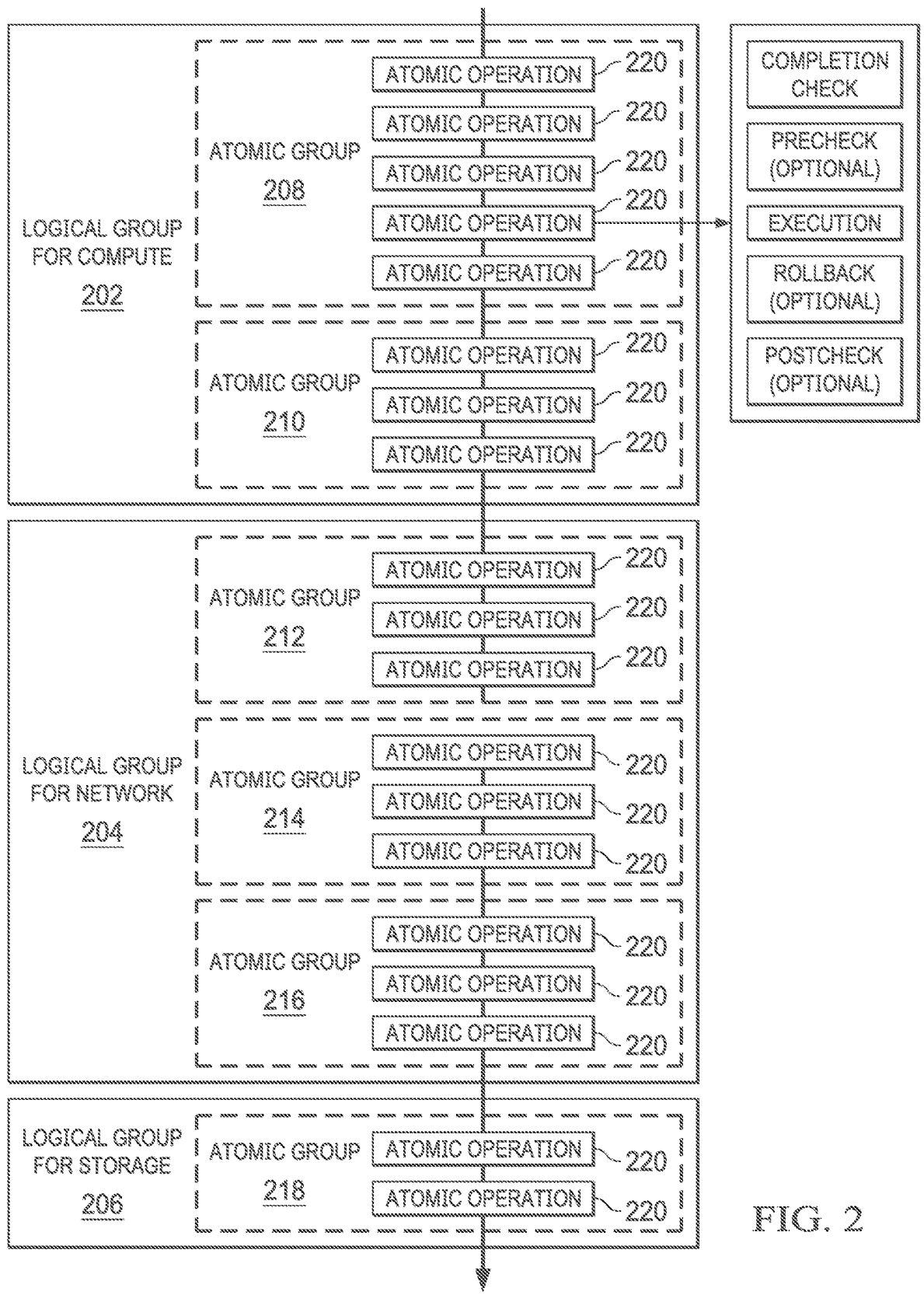
FIG. 2 illustrates a block diagram of a set of atomic groups and operations for configuring an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may allow for performing information handling system installation (e.g., HCI cluster installation) in a more robust manner than has heretofore been possible.

In some embodiments, the HCI installation workflow may be broken down into atomic groups, each consisting of one or more logically dependent atomic operations. Each atomic operation can be rolled back or rolled forward, and each atomic group is an independent sub-workflow that can be performed logically together.

Accordingly, any failures in a particular atomic group may impact only the other atomic operations in that group, and they may not affect any previously completed atomic groups. After a failure occurs, the current atomic operation may be automatically rolled back, and the installation may be resumed not from the failed atomic operation, but from the first step in the failed atomic group. Some examples of atomic operation groups may include host configuration, virtual network configuration, physical network configuration, storage configuration, etc. Additionally, each atomic operation may follow a template of steps, e.g., a completion check, a pre-check, an execution, a rollback if needed, and a post-check. Accordingly, in these and other embodiments, an atomic operation may be skipped if it is already completed or optionally rolled back if failure occurs. The pre-check may be used to carry out any needed tests prior to execution, and the post-check may be used to carry out any needed tests after execution.

In various embodiments, such steps may be carried out by a host system, a management controller, a different system within a cluster, a management system outside a cluster, etc.

Turning now to FIG. 2, a block diagram of a set of atomic groups and operations for configuring an information handling system is shown, in accordance with embodiments of the present disclosure.

In FIG. 2, the configuration of an information handling system is broken down into three main groups: a logical group 202 for compute, a logical group 204 for network, and a logical group 206 for storage. Each of these logical groups may be further broken down into one or more atomic groups. For example, logical group 202 for compute is broken down into atomic groups 208 and 210. Logical group 204 for network is broken down into atomic groups 212, 214, and 216. Logical group 206 for storage includes only one atomic group, atomic group 218.

Each of the atomic groups 208-218 may further include one or more atomic operations 220.

In this example, logical group 202 for compute may be used to configure each compute host in the cluster. The atomic operations 220 in logical group 202 for compute may include operations such as IP network configuration, DNS configuration, NTP configuration, etc. When a failure in the compute workflow occurs, only one compute host may be impacted. Logical group 204 for network may be used to configure a virtual network switch in the virtual datacenter, etc. Logical group 206 for storage may be used to configure a virtual SAN storage and/or other types of software-defined storage, etc.

In general, when resuming from a previous failure, the current atomic group may typically restart from the first atomic operation 220 in that group.

As shown in FIG. 2, each atomic operation may include 5 steps in some embodiments: a completion check, an optional pre-check, an execution, an optional rollback, and a post-check. If the completion check is successful, then the atomic operation has already been completed and may be skipped. For example, the completion could have been already performed manually by a user.

When a failure occurs, the current atomic operation 220 may be rolled back. Examples of atomic operations 220 may include items like host IP configuration, virtual distributed network creation, vSAN disk group creation, etc.

An example host configuration failure scenario may proceed as follows. When a host configuration fails due to a network card failure, the installation workflow may stop, and proper errors may be returned to the user. The user will typically send someone locally to shut down the host, replace the network card, and power up the host. Additionally, the local personnel may decide to configure the network manually to test the card. Once the host starts running, the installation can be resumed remotely.

When resuming, the installation workflow may start from the first step of the logical atomic group in which the failure occurred to reconfigure the host. Each atomic operation may be reentrant, so that the workflow skips any completed configuration steps and only performs the configuration step if it has not yet been completed.

Upon the success of the host configuration, the host atomic group workflow is marked as complete, and the installation workflow proceeds to the next atomic group.

Further, in some embodiments, the end user may be able to get status updates regarding the installation progress on demand.

Accordingly, embodiments of this disclosure may provide many advantages. For example, a mechanism is provided to divide the HCI cluster installation workflow into independent groups, and in some embodiments each group workflow may be reentrant. Further, a mechanism is provided to group logical atomic operations into an atomic group, such that each atomic operation may be rolled back during failure or rolled forward after a successful completion check. Still further, a mechanism is provided to resume the installation after the failure issues are fixed and/or additional manual configuration steps are performed.

In some embodiments, techniques as disclosed herein may also be applied to other long-running configuration processes to ease retry logic.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to execute a configuration procedure to set up a plurality of information handling resources of the information handling system, and wherein the configuration procedure includes a plurality of logical groups related to different types of configuration;
   wherein each logical group includes one or more atomic groups, each atomic group including a plurality of logically related atomic operations; and
   wherein, in response to a failure of a particular atomic operation of a particular atomic group, the information handling system is configured to roll back the particular atomic operation and allow the configuration procedure to be restarted at a beginning of the particular atomic group.

2. The information handling system of claim 1, wherein the plurality of logical groups includes a logical group for compute, a logical group for network, and a logical group for storage.

3. The information handling system of claim 1, wherein the information handling system is a hyper-converged infrastructure (HCI) system.

4. The information handling system of claim 1, further including a management controller configured to provide out-of-band management of the information handling system.

5. The information handling system of claim 4, wherein the management controller is configured to execute the configuration procedure.

6. The information handling system of claim 1, wherein, for each atomic operation, the information handling system is configured to carry out a completion check prior to execution of the atomic operation.

7. The information handling system of claim 6, wherein, in response to the completion check indicating that the atomic operation has already been completed, the information handling system is configured to skip the atomic operation.

8. The information handling system of claim 1, wherein, for each atomic operation, the information handling system is configured to carry out at least one pre-check test prior to execution of the atomic operation and at least one post-check test subsequent to execution of the atomic operation.

9. A method comprising:

executing, at an information handling system, a configuration procedure to set up a plurality of information handling resources of the information handling system, wherein the configuration procedure includes a plurality of logical groups related to different types of configuration;

for each logical group, the information handling system executing one or more atomic groups, each atomic group including a plurality of logically related atomic operations; and in response to a failure of a particular atomic operation of a particular atomic group, the information handling system rolling back the particular atomic operation and allowing the configuration procedure to be restarted at a beginning of the particular atomic group.

10. The method of claim 9, wherein the plurality of logical groups includes a logical group for compute, a logical group for network, and a logical group for storage.

11. The method of claim 9, wherein the information handling system is a hyper-converged infrastructure (HCI) system.

12. The method of claim 9, further comprising:

for each atomic operation, carrying out at least one pre-check test prior to execution of the atomic operation and at least one post-check test subsequent to execution of the atomic operation.

13. An article of manufacture comprising a non-transitory, computer-readable medium having computer-executable code thereon that is executable by an information handling system for:

executing a configuration procedure to set up a plurality of information handling resources of the information handling system, wherein the configuration procedure includes a plurality of logical groups related to different types of configuration;

for each logical group, executing one or more atomic groups, each atomic group including a plurality of logically related atomic operations; and in response to a failure of a particular atomic operation of a particular atomic group, rolling back the particular atomic operation and allowing the configuration procedure to be restarted at a beginning of the particular atomic group.

14. The article of claim 13, wherein the plurality of logical groups includes a logical group for compute, a logical group for network, and a logical group for storage.

15. The article of claim 14, wherein the information handling system is a hyper-converged infrastructure (HCI) system.

16. The article of claim 13, wherein the information handling system further includes a management controller configured to provide out-of-band management of the information handling system.

17. The article of claim 16, wherein the management controller is configured to execute the configuration procedure.

18. The article of claim 13, wherein, for each atomic operation, the information handling system is configured to carry out a completion check prior to execution of the atomic operation.

19. The article of claim 18, wherein, in response to the completion check indicating that the atomic operation has already been completed, the information handling system is configured to skip the atomic operation.

20. The article of claim 13, wherein, for each atomic operation, the information handling system is configured to carry out at least one pre-check test prior to execution of the atomic operation and at least one post-check test subsequent to execution of the atomic operation.

* * * * *